(12) United States Patent
Piirainen et al.

(10) Patent No.: US 11,438,044 B1
(45) Date of Patent: Sep. 6, 2022

(54) INTERFERENCE AWARE EIGEN-BEAMFORMING BASED ON SECOND ORDER STATISTICS

(71) Applicant: Nokia Solutions and Networks Oy, Espoo (FI)

(72) Inventors: Olli Juhani Piirainen, Oulu (FI); Jari Vilho Ylioinas, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/694,790

(22) Filed: Mar. 15, 2022

(30) Foreign Application Priority Data

Jul. 15, 2021 (FI) .................................... 20215808

(51) Int. Cl.
*H04B 7/06* (2006.01)
*H04B 7/0456* (2017.01)
*H04W 52/24* (2009.01)

(52) U.S. Cl.
CPC ......... *H04B 7/0617* (2013.01); *H04B 7/0456* (2013.01); *H04W 52/241* (2013.01)

(58) Field of Classification Search
CPC .. H04B 7/0617; H04B 7/0456; H04W 52/241
See application file for complete search history.

(56) References Cited

U.S. PATENT DOCUMENTS

| | | | | |
|---|---|---|---|---|
| 11,252,045 B1* | 2/2022 | Moinuddin | ........... | H04L 41/147 |
| 11,323,164 B2* | 5/2022 | Hong | .................... | H04B 7/0617 |
| 2011/0115675 A1* | 5/2011 | Sanayei | ............... | H04B 7/0634 |
| | | | | 342/373 |
| 2011/0205930 A1* | 8/2011 | Rahman | ................ | H04L 5/0023 |
| | | | | 370/252 |
| 2012/0287799 A1* | 11/2012 | Chen | .................... | H04B 7/0626 |
| | | | | 370/252 |

(Continued)

OTHER PUBLICATIONS

Al-Asadi, Ahmed, et al., "Worst case fair beamforming for multiple multicast groups in multicell networks", © 2018 The Institution of Engineering and Technology, 8 pgs.

(Continued)

*Primary Examiner* — Jaison Joseph
(74) *Attorney, Agent, or Firm* — Harrington & Smith

(57) ABSTRACT

Solutions to determine how to form beams when co-operating multiple-input multiple-output antenna panels are used are disclosed. Beams are formed according to sets of beamforming weights corresponding to minimized total transmit power from an antenna array of interest to served terminal devices. Optimization to minimize total transmit power subject to a predefined constraint on a minimum allowable expected value of signal-to-interference-plus-noise ratio, SINR, is performed. In the optimization expected values of SINR for a terminal device are calculated based on based on the sets of beamforming weights for at least the served terminal devices, and weighted second order statistics, wherein a weighting factor for second order statistics between the served terminal devices and the antenna array is one and weighting factors for the other second order statistics less than one. The second order statistics are included in maintained channel state information.

12 Claims, 3 Drawing Sheets

(56) References Cited

U.S. PATENT DOCUMENTS

2018/0083816 A1* 3/2018 Bolstad .............. H01Q 21/0025
2022/0021426 A1* 1/2022 Piirainen ............. H04W 52/241

OTHER PUBLICATIONS

Toutounchian, Mildad Amir, et al., "Beamforming for MIMO Cognitive Radio with single Primary and Multiple Secondary Users", 2016 IEEE Canadian Conference on electrical and Computer Engineering, 5 pgs.

Chou, Su-An, et al., "A Unified and Flexible Eigen-Solver for Rank-Deficient Matrix in MIMO Precoding/Beamforming Applications", © 2019 IEEE, 6 pgs.

Agrahari, Abhishek, et al., "Precoding and Downlink Beamforming in Multiuser MIMO-OFDM Cognitive Radio Systems with Spatial Interference Constraints", © 2017 IEEE, 12 pgs.

* cited by examiner

INTERFERENCE AWARE EIGEN-BEAMFORMING BASED ON SECOND ORDER STATISTICS

TECHNICAL FIELD

Various example embodiments relate to wireless communications.

BACKGROUND

The 5G massive MIMO uses beamforming in order to maximize antenna gain for users. These schemes are essential for obtaining high gain with massive MIMO systems. However, several limitations exist with the current beamforming schemes relating to the performance obtained using the beamforming scheme and the computational complexity of the beamforming scheme. The performance of the beamforming scheme depends on the used algorithm as well as on the type and amount of information required by said algorithm. Typically in 5G, the required information is obtained by reports sent by terminal devices and/or is based on sounding reference signal (SRS) estimation in uplink. Furthermore, often the more advanced the beamforming schemes require as input more channel state information (CSI) and, as a consequence, such advanced beamforming schemes can often be quite sensitive to estimation errors. Also, the computational complexity often becomes a problem when more advanced beamforming schemes employing large amounts of CSI are used.

Thus, there is a need for a beamforming solution which would provide high performance without excessive computational complexity.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
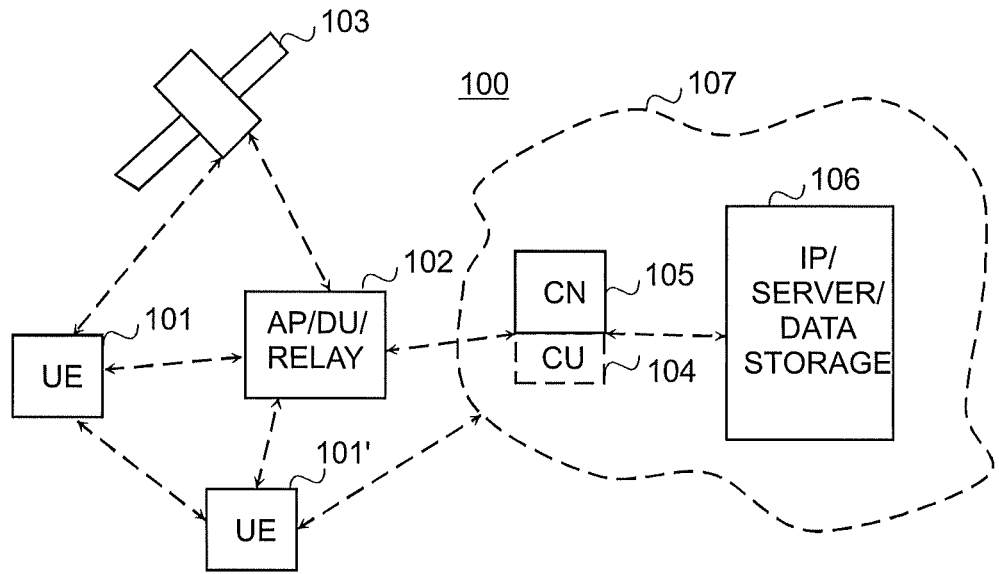
FIG. 1 illustrates an exemplary wireless communication system according to embodiments.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Each user device may comprise one or more antennas. It should be appreciated that a user device may also be a nearly exclusive uplink only device, of which an example is a camera or video camera loading images or video clips to a network. A user device may also be a device having capability to operate in (Industrial) Internet of Things ((I)IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using (massive) multiple input-multiple output ((m)MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. A MIMO antenna (comprising a plurality of antenna elements) may be equally called a MIMO array antenna or a MIMO antenna array (comprising a plurality of antenna elements) or a MIMO panel (comprising a plurality of antenna elements). 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, co-operative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to co-operate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged to improve performance of a multiuser MIMO, MU-MIMO, especially in downlink, by implementing a concept called distributed MIMO, dMIMO. In the distributed MIMO antenna arrays may co-operate and MU-MIMO pairing can be performed over co-operating antenna arrays, thereby providing a massive MIMO.

Figure 2:
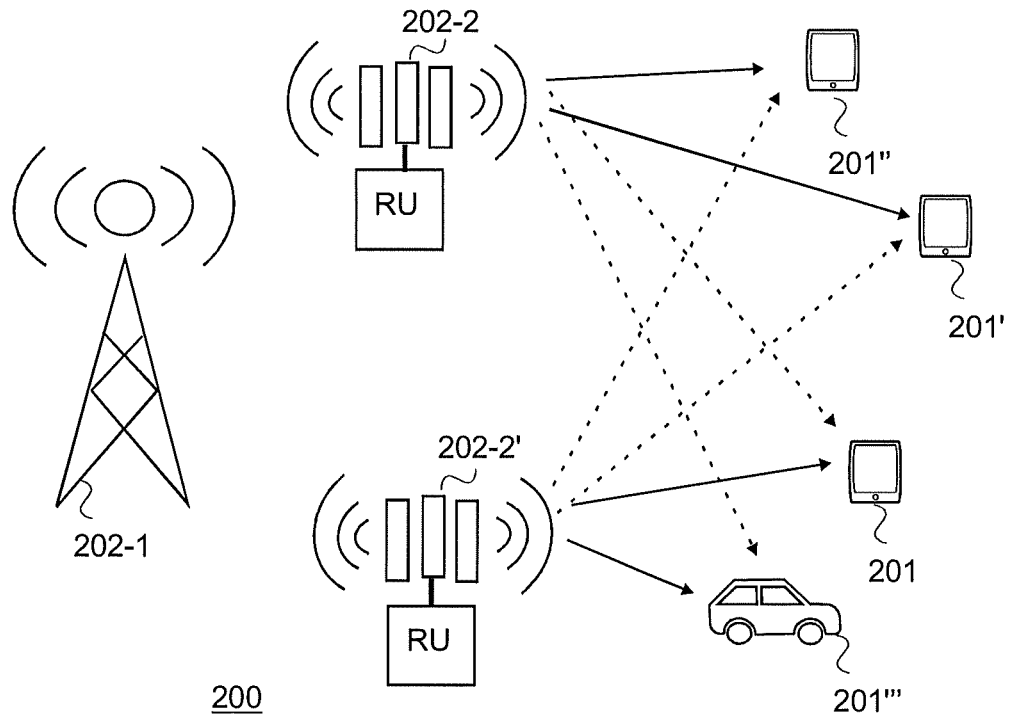
FIG. 2 illustrates an exemplary antenna arrangement.

FIG. 2 provides a highly simplified overview of the distributed MIMO, illustrating two dMIMO antenna arrays (depicting a plurality of antenna arrays forming a group of co-operating antenna arrays), in a hot spot one cell scenario 200, without limiting following examples of beamforming to such a scenario.

Referring to FIG. 2, closely located antenna arrays 202-2, 202-2', for example in a hot spot one cell scenario 200, co-operate to provide multi-user pairing to users (i.e., terminal devices). An antenna array 202-2, 202-2' may be an antenna array of an access node, e.g. an access point or a base station, or it may be a remote radio unit (RU). For the co-operation, there may be one or more processing units, that may be comprised in the antenna array as one or more computing devices, or be comprised in in the access node, or be a separate unit, e.g. a separate computing device, shared by two or more co-operating antenna arrays or access nodes, or be comprised in a macro base station 202-1.

The users, i.e. different terminal devices 201, 201', 201", 201''', share the same time-frequency resources of the co-operating antenna arrays, depicted by arrowhead solid lines in FIG. 2, the transmission to a terminal device 201, 201', 201", 201''' taking place from the one of the co-operating antenna arrays that provides the best long term beam, as in conventional MU-MIMO. However, the antenna array causes interference also to terminal devices connected to co-operating antenna arrays as depicted by arrowhead dashed lines in FIG. 2. In other words, a plurality of terminal devices have access to network via the co-operating antenna arrays, terminal devices served by an antenna array of the co-operating antenna arrays being a subset of the plurality of terminal devices that may suffer from interference caused by the co-operating antenna arrays. (A terminal device served by an antenna array is a terminal device connected to the antenna array, or connected via the antenna array to the radio access network.)

The 5G massive MIMO systems as described above require solutions for processing data for a large number of antenna elements so as to perform beamforming efficiently and effectively. These schemes are essential for obtaining high gain with massive MIMO systems. Ideally, the beamforming schemes should be such that high system performance (e.g., spectral efficiency) is obtained without excessive implementation complexity. The performance of the beamforming scheme depends on the used algorithm as well as on the type and amount of information required by said algorithm. Typically in 5G, the required information is obtained by reports sent by terminal devices and/or is based on sounding reference signal (SRS) estimation in uplink. The sounding reference signal is a reference signal transmitted by the terminal device in the uplink direction (i.e., to the access node) which may be used for estimating the uplink channel quality over a wide bandwidth. Furthermore, often the more advanced the beamforming schemes require as input more channel state information (CSI) and, as a consequence, such advanced beamforming scheme can often be quite sensitive to estimation errors. Also, the computational complexity often becomes a problem when more advanced beamforming schemes employing large amounts of CSI are used. Typically, the solutions require matrix operations which have computational complexity of $O(n^3)$.

As the size of the required matrices and their number increases, the computational complexity may easily become too high for practical systems.

Well-known beamforming schemes include Grid-of-Beams (GoB), eigenbeamforming (EBB) and various Zero Forcing (ZF) schemes. In addition to the algorithms themselves being different, the aforementioned beamforming schemes differ in regards to the input information that is required by them. Typically, the GoB solutions are static (i.e., use only first order statistics), the EBB solutions operate using second order statistics and ZF solutions (and any variants thereof) use full or perfect channel state information (CSI). Full or perfect CSI corresponds to complete knowledge of the ideal channel response. Full or perfect CSI is typically not available outside simulations. From the aforementioned alternatives, the Zero Forcing schemes have the largest potential performance provided that full CSI (i.e., accurate channel matrix) is available. However, the problem with said schemes lies with obtaining high quality full CSI, e.g., using sounding reference signals (SRS), especially in interference limited scenarios and far from the cell edge. High quality (up-to-date) full CSI can be rather hard to achieve also due to the delay between channel estimation and applying the beamforming weights. High quality full CSI can often be achieved if the users (i.e., terminal devices) are static (i.e., not moving) though achieving high quality full CSI with moving users, especially users having moderate-to-high velocity, is often not feasible. Another potential problem is the high computational complexity required. The solutions according to embodiments to be discussed below seek to overcome the aforementioned limitations with earlier beamforming schemes by combining eigenbeamforming methodology with using second order statistics (instead of full CSI) and further taking into account multiuser interference (which is not taken into account in conventional eigenbeamforming) in co-operating antenna arrays.

As embodiments correspond to a co-operating interference aware eigenbeamforming (a co-operating interference aware eigen based beamforming), a basic interference aware eigenbeamforming, i.e. interference aware eigenbeamforming not taking into account co-operative antenna arrays, is discussed here in brief in order to facilitate the discussion of the embodiments. In the basic interference aware eigenbeamforming, interference caused by the transmission using multiple beams is taken into account, but not the interference caused by co-operating antenna arrays. For the interference aware eigenbeamforming scheme, channel state information (CSI) of a plurality of radio channels between an antenna array and a plurality of terminal devices is maintained in a database. Here, as said above, the antenna array may specifically be a multiple-input multiple-output (MIMO)-antenna array comprising a plurality of antenna elements, controllable by e.g. an access node for performing beamforming using said MIMO antenna array. The plurality of terminal devices may be specifically configured (or scheduled) to use the same time and/or frequency resource(s) (i.e., the same physical resource block or blocks) for reception from the antenna array. The CSI may comprise one or more (current and/or historical) channel matrices for each of the plurality of radio channels. More specifically, the CSI maintained in the database for the interference aware eigenbeamforming is assumed to comprise at least second order statistics of the plurality of radio channels between the antenna array and the plurality of terminal devices. The CSI may also comprise first order statistics of the plurality of radio channels. First order statistics of a radio channel only capture the static behavior of the radio channel (i.e., they describe an arithmetic mean of a data set). On the other hand, second order statistics of a radio channel are able to capture the correlation properties of the radio channel (i.e., they describe a variance of a data set with respect to the arithmetic mean or, when matrices are considered, a covariance matrix of a matrix corresponding to the data set) and are thus able to provide a dynamic representation of the system performance. In other words, the first order statistics correspond to a first moment of a data set while the second order statistics correspond to a second moment of a data set. Depending on an implementation, the CSI of the plurality of radio channels maintained in the database may specifically be limited to the second order statistics of the plurality of radio channels or to the first and second order statistics of the plurality of radio channels. In other words, full up-to-date CSI for the plurality of radio channels may not be readily available.

The CSI maintained in the database may have been acquired and/or calculated based on, e.g., the SRS measurements performed by the access node with each of the plurality of terminal devices and/or other radio measurements (e.g., timing advance, time of arrival and/or pathloss measurements) carried out between the access node and the plurality of terminal devices. The CSI maintained in the database may be updated regularly as new radio measurements are carried out.

The channel may be modelled by a following linear channel model:

$$y_i = H_i t_i x_i + \sum_{k \neq i} H_i t_k x_k + n, \quad (1)$$

where
i and k are indices indicating ith and kth terminal devices,
$y_i \in \mathbb{C}^{M_i \times 1}$ is the received signal of ith terminal device,
$H_i \in \mathbb{C}^{M_i \times N}$ is the ith terminal device channel matrix of N terminal devices,
$t_i \in \mathbb{C}^{N \times r_i}$ is beamforming matrix where $r_i$ is the rank of the ith terminal device,
$x_i \in \mathbb{C}^{r_i \times 1}$ is the transmitted signal of the ith terminal device, the sum-term over k describes the interference caused by other terminal devices sharing the same antenna array and the same resources as the terminal device fin the basic scheme and in the co-operating scheme it describes the interference caused by co-operative antenna arrays and other terminals served by the co-operative antenna arrays, and
$n \in \mathbb{C}^{M_i \times 1}$ contains the noise in a receiver of the ith terminal device.

The beamforming matrices $t_i$ are to be optimized. An optimization problem may be formulated to be:

$$\min \sum_i \|t_i\|^2 \quad (2)$$

subject to $$\gamma_i \leq \frac{t_i^H R_i t_i}{\sum_{k \neq i} t_k^H R_i t_1 + \delta^2},$$

where
$\|\cdot\|$ is the 2-norm,
$\gamma_i$ defines the SINR constraint,
$R_i$ is a channel covariance matrix, i.e. $R_i = E(H_i^H H_i)$ with $H_i$ being a channel matrix for the ith terminal device, E denoting an expected value and H denoting a conjugate transpose operation, and
$\delta^2$ is a noise term By using beam weights obtained as a solution of the optimization problem above (equation 2), interference between MU-MIMO terminal devices receiving transmissions from the antenna array can be suppressed, for example to be a following solution:

$$\left(I + \sum_k \frac{\lambda_k}{\delta^2} R_k\right)^{-1} R_i t_i = \frac{\delta^2}{\lambda_i}\left(\frac{\gamma_i}{\gamma_i + 1}\right) t_i, \quad (3)$$

where
I is an identity matrix,
$\lambda_k$ is a Lagrangian multiplier for the kth terminal device The Lagrangian multiplier $\lambda_k$ corresponds to transmit power P by $\Sigma_k \lambda_k = P$ through dual function min J $(\lambda_1, \ldots, \lambda_N)$. Using that information and the above equation (3), for a given $\gamma_i$ the $\lambda_k$ is minimized by the largest eigenvalue of following equation:

$$\left(I + \sum_i \frac{\lambda_i}{\delta^2} R_i\right)^{-1} R_k \quad (4)$$

The optimum beam shape is then defined by the related eigenvector. In other words, the eigenvector corresponding to the largest eigenvalue, corresponds to a set of optimal beamforming weights for the ith terminal device.

In other words, when channel state information of a plurality of radio channels between an access node, which is a multiple-input multiple-output, MIMO, -capable access node, and a plurality of terminal devices, is maintained in a database and the channel state information comprises second order statistics of the plurality of radio channels, an apparatus, for example an access node, may be configured to: performing optimization to minimize total transmit power for transmission from the access node to the plurality of terminal devices subject to a predefined constraint on a minimum allowable expected value of signal-to-interference-plus-noise ratio, SINR, for the plurality of the terminal devices, wherein the total transmit power is defined, in the optimization, based on sets of beamforming weights used for forming beams for transmitting to the plurality of terminal devices and the predefined constraint is evaluated, in the optimization for each of the plurality of terminal devices, by calculating expected values of SINR for a terminal device based on second order statistics for the terminal device and the sets of beamforming weights for the plurality of terminal devices; and cause transmitting data using one or more beams formed according to sets of beamforming weights corresponding to minimized total transmit power from the access node to the plurality of terminal devices.

It should be noted that the above described basic beamforming scheme converges to a conventional eigenbeamforming as the amount of interference goes to zero or as signal-to-noise ratio approaches zero. The basic interference aware eigenbeamforming scheme, and as a consequence, also the a co-operating interference aware eigenbeamforming, has certain advantages. Firstly, the derived algorithm is based on second order statistics and allows averaging over time and frequency. In other words, the solution is effectively static in nature. This improves the estimation accuracy of the required input. The beam derivation is also constant over frequency for a given set of scheduled terminal devices. Thus, there is only one shared matrix inversion for all frequency resources and set of scheduled terminal devices (i.e., the solution needs to be calculated only once). Finding the largest eigenvalues and the corresponding eigenvectors for each of the plurality of terminal device is, then, a relatively simple operation with, e.g., using power method. As a comparison, the Zero Forcing scheme needs to be calculated separately for different frequency resources. As an example, a 100 MHz wide 5G carrier has 273 physical resource blocks (PRB). To get the frequency selective ZF solutions the equations need to be solved 273 times. If the scheduled terminal devices occupy the whole bandwidth, the proposed solution in the given example needs to be solved only once.

Figure 3:
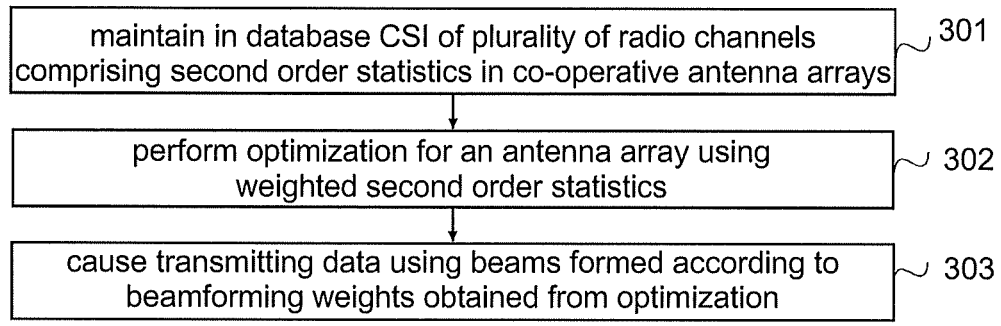
FIGS. 3 and 4 illustrate exemplary processes according to embodiments.

The basic interference aware eigenbeamforming scheme may be enhanced to the co-operating interference aware eigenbeamforming scheme. FIG. 3 illustrates a process for performing a beamforming scheme, based on the above discussed basic interference aware eigenbeamforming scheme, enhanced for cooperating antenna arrays that are not cross-calibrated. The process may be performed by a processing unit for the co-operation.

Referring to FIG. 3, channel state information of a plurality of radio channels between co-operating antenna arrays and a plurality of terminal devices is maintained in block 301, in a database, per an antenna array of co-operating antenna arrays, wherein the antenna arrays are multiple-input multiple-output, MIMO, -capable antenna arrays and the channel state information comprises second order statistics of the plurality of radio channels per an antenna array of the co-operating antenna arrays. As discussed above, the CSI may be limited to the second order statistics, or comprise second order statistics and, at least for one or more of the co-operating antenna arrays, first order statistics at least on some terminal devices. Further, the CSI may be acquired and/or calculated and updated as described above.

Using the maintained information, optimization is performed in block 302 to minimize, per an antenna array of the co-operating antenna arrays, total transmit power for transmission from the antenna array to terminal devices served by the antenna array subject to a predefined constraint on a minimum allowable expected value of signal-to-interference-plus-noise ratio, SINR, for the terminal devices served by the antenna array. The total transmit power is defined, in the optimization, based on sets of beamforming weights used for forming beams for transmitting to the terminal devices served and the predefined constraint is evaluated, in the optimization for the antenna array for at least each of the served terminal devices, by calculating expected values of SINR for a terminal device based on the sets of beamforming weights for at least the served terminal devices, and weighted second order statistics, wherein a weighting factor for second order statistics between the terminal devices served and the antenna array is one and weighting factors for the other second order statistics less than one. In another implementation, a weighting factor for second order statistics between the terminal device whose expected values of SINR are calculates and the antenna array is one and weighting factors for the other second order statistics less than one. Still further possibilities to assign weighting factors may be used.

Transmitting data, from the antenna array to the served terminal devices, using one or more beams formed according to sets of beamforming weights corresponding to minimized total transmit power is caused in block 303.

For example, in block 302, an equation based on the above equation (3) may be used for the co-operating antenna arrays that are not cross-calibrated to calculate beam shapes, when channel covariance matrixes R have a block diagonal structure containing, per an antenna array, covariance matrices on their diagonal. Assuming that covariance matrices are normalized per an antenna array, equation (3) may be simplified for co-operating antenna arrays to equation (5):

$$\left(I + \sum_j a_j \left(\sum_k \frac{\lambda_k^j}{\delta^2} R_k^j\right)\right)^{-1} R_i^l t_i^l = \frac{\delta^2}{\lambda_i^l}\left(\frac{\gamma_i}{\gamma_i + 1}\right)t_i^l, \quad (5)$$

where
i and k are indices indicating the ith and kth terminal device of the plurality of terminal devices,
j and l are indices referring to a jth antenna array and lth antenna array of the cooperating antenna arrays,
I is an identity matrix,
$a_j$ is a weighting factor of jth antenna array having a value ≤1,
$\lambda_k^j$ a Lagrangian multiplier for the jth antenna array for the kth terminal device,
$\delta^2$ is a noise term,
$R_k^j$ is a channel covariance matrix for the jth antenna array defined as $E(H_k^H H_k)$ with $H_k$ being a channel matrix for the kth terminal device for the jth antenna array,
E denoting an expected value and H denoting a conjugate transpose operation,
$t_i^l$ is a beamforming matrix for the ith terminal device defining a set of beamforming weights for the lth antenna array,
$\gamma_i$ is the minimum allowable expected value of SINR for the ith terminal device.

The weighting factor $a_j$ can be seen as a separation parameter between co-operating antenna arrays, by means of which terminal devices connected to the other co-operating antenna arrays (other than an antenna array of interest, lth antenna array, for which the beamforming vectors are currently optimized) have a lower signal to the antenna array of interest (lth antenna array), and thus the other antenna array terminal devices covariance matrix can be down-scaled with factor $a_j<1$, for example when per an antenna array normalized covariance matrices are used. Using the example illustrated in FIG. 2, assuming that the antenna array 202-2' is lth antenna array, and the terminal device 201 ith terminal device, channel state information between the antenna array 202-2' and terminal devices 201, 201" served by the antenna array 202-2' will have a weighting factor one, channel state information between the antenna array 202-2' and terminal devices 201', 201''' served by the antenna array 202-2 may have a weighting factor smaller than one, and channel state information between the antenna array 202-2 and any of the plurality terminal devices 201, 201', 201", 201''' will have a weighting factor smaller than one.

In some embodiments, the Lagrangian multiplier $\lambda_k^j$ may have a predefined value. Said predefined value may or may not be different for different j and/or k indices. In some embodiments, the Lagrangian multiplier may have the same value for all j and/or for all k. The same value for all k would guarantee fairness of power allocation between terminal devices.

In other embodiments, the Lagrangian multiplier $\lambda_k^j$ may not have a predefined value. In such cases, the values of the Lagrangian multiplier are determined through iteration during the optimization process.

In further embodiments, it depends on the antenna array j, whether the Lagrangian multiplier has or has not a predetermined value(s).

Figure 4:
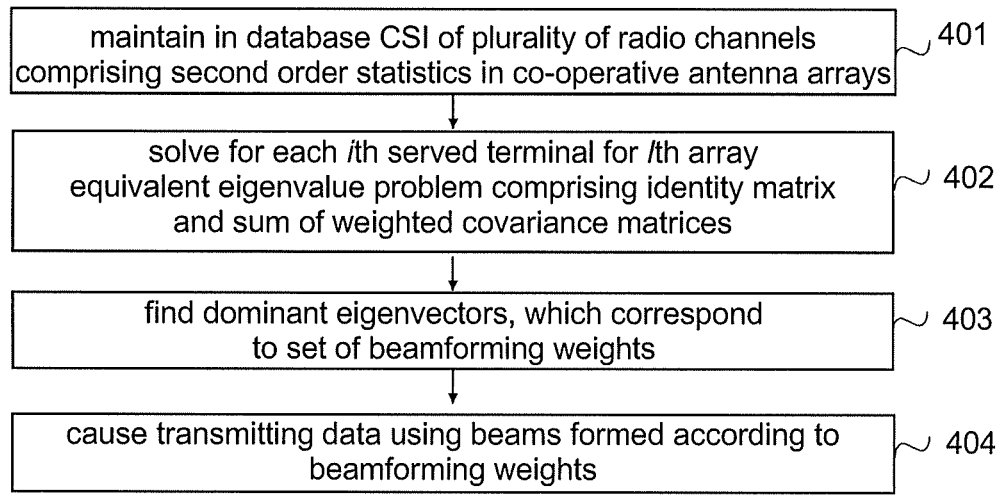

FIG. 4 illustrates another process according to embodiments for performing beamforming using a co-operating interference aware eigenbeamforming according to embodiments. The illustrated process is, to a large extent based on the embodiments discussed in relation to FIG. 3 and features described in relation to FIG. 3 may be integrated into the embodiments of FIG. 4.

Referring to FIG. 4, blocks 401, 404 of the illustrated process may correspond to blocks 301, 303 of FIG. 3. Actions pertaining to these blocks are not discussed here (again) for brevity.

The described process is based on that the beamforming vectors of a terminal device i are the dominant eigenvector(s) of matrix $$T_i^l = S^{-1} R_i^l, \quad (6)$$

where
S is the sum of identity matrix and scaled averaged user specific covariance matrices, which may be expressed using equation (7):

$$S = I + \sum_j a_j \left( \sum_k \frac{\lambda_k^j}{\delta^2} R_k^j \right) \quad (7)$$

In the embodiments of FIG. 4, per an antenna array, lth antenna array, at least for each terminal device served by the antenna array, the equation (7) is solved in block 402. In other words, an equivalent eigenvalue problem, which comprises an identity matrix and sum of weighted covariance matrices is solved.

After the equation (7) has been calculated at least for all terminal devices served in block 402, dominant eigenvectors, which correspond to set of beamforming weights, are found in block 403. Finding may include finding n largest eigenvalues of equation (7) separately for each served terminal device. Here, n is an integer equal to or larger than one. Furthermore, the apparatus finds, in block 304, for each of the n largest eigenvalues, a corresponding eigenvector. The beamforming vectors of the terminal device i may be expressed using equation (8):

$$w_i^l = evd(t) \in \mathbb{C}^{N \times r_i} \quad (8)$$

where
$r_i$ is the rank of user i.

The entire beamforming matrix for the lth antenna array of the co-operating antenna arrays may be constructed as $$W^l = [w_1^l w_2^l \ldots w_K^l] \in \mathbb{C}^{N \times R} \quad (9)$$

Each eigenvector corresponds, here, to a set of optimal beamforming weights for a MIMO layer of a terminal device. In other words, the n eigenvectors found in block 403 for a certain terminal device are orthogonal eigenvectors for that terminal device. Thus, by selecting several largest eigenvector, i.e. n being larger than one, one gets several orthogonal beams for separate MIMO layers. This property is enabled by the fact that the provided solution according to embodiments works with correlation matrices which, by definition, have a rank which is larger than one.

In some embodiments, the number of largest eigenvalues and corresponding eigenvectors for terminal devices served may vary, i.e. the value of n may be the same or different for all terminal devices served.

Once multiple eigenvectors have been found, in block 403, a rank selection may be performed for the terminal devices served, or at least for at least one terminal device served based on results. In other words, it may be determined, in block 403, how many MIMO streams (i.e., how many orthogonal beams) should be used for transmission to a given terminal device. This determination may be based on, e.g., values (or magnitudes) of the calculated eigenvalues. For example, if the ratio between the largest and second largest eigenvalues for a given terminal device is not too large (i.e., said ratio is below a certain predefined limit), a high-quality channel for a higher rank (higher SU-MIMO order) may be determined to be available and thus may be used for transmission. In other words, beamforming weights defined by the eigenvectors associated with the largest eigenvalue and the second largest eigenvalue are used for transmission to the corresponding terminal device. In general (with n being any integer larger than one), the aforementioned ratio for xth largest eigenvalue may be calculated as a ratio between the largest eigenvalue and xth largest eigenvalue, where x is an integer larger than one. In some embodiments, the rank for each of the plurality of terminal devices (or at least some of them) may be predefined.

Then transmitting data using one or more beams formed according to sets of optimized beamforming weights as well as according to the rank selection is caused in block 404, for example using matrix according to equation (9) from the antenna array to the terminal devices served.

Even though not discussed above, a full solution to the beamforming problem may an iterative process. For example, first, a set of power values may be defined and corresponding sets of beamforming weights may be optimized. Thereafter based on the SINR calculated for terminal devices, the power values may be modified and subsequently the process may be repeated with the updated power values. These steps may be repeated until certain predefined conditions, for example for the SINR, have been satisfied.

In some embodiments, the transmit power allocated in an antenna array for terminal devices may be predefined. The power may be distributed between terminal devices served, e.g., based on pathloss and/or spatial correlation associated with the plurality of terminal devices.

It should be appreciated that the contents or type of the data transmitted is irrelevant in view of the embodiments. Said data may comprise at least one data symbol. In some instances, some of the sets of optimized beamforming weights may be zero and consequently no data may be transmitted for the corresponding terminal device(s).

Further, it should be appreciated that the number of said one or more beams from an antenna array may be equal to or smaller than the number of terminal devices served by the antenna array.

Figure 5:
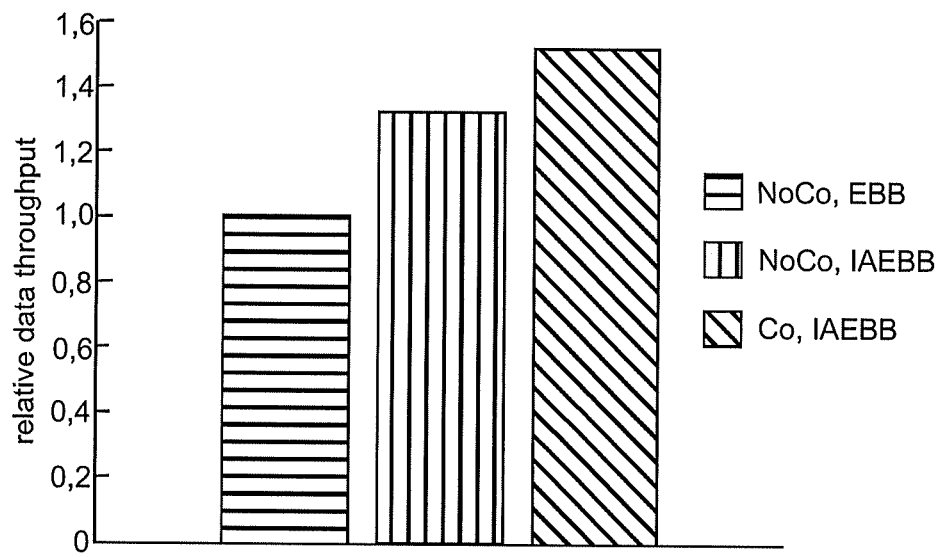
FIG. 5 shows simulation results.

FIG. 5 shows simulation results for two distributed MIMO antenna arrays in a hot spot one cell scenario, for example the one illustrated in FIG. 2. In the simulation it has been assumed that all users (terminal devices) are transmitted with equal power and a fixed level for noise has been used. The performance has been simulated for three different scenarios:

- no co-operation (NoCo) between the two distributed MIMO antenna arrays and both are using eigenbased beamforming (EBB), results shown by horizontally lined column
- no co-operation (NoCo) between the two distributed MIMO antenna arrays and both are using the basic interference aware eigenbased beamforming (IAEBB), results shown by vertically lined column
- co-operation (Co) between the two distributed MIMO antenna arrays and both are using the co-operating interference interference aware eigenbased beamforming (IAEBB), results shown by diagonally lined column.

As can be seen, disclosed embodiments and examples take the interference into account within terminal devices connected to an antenna array and also across all co-operating antenna arrays. Thus, the beams created for terminal devices served by one antenna array avoid also interfering co-operating antenna arrays, i.e. beams created for terminal devices served by another co-operating antenna array.

The blocks, related functions, and information exchanges described above by means of FIGS. 2 to 4 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information. For example, instead of maintaining the database by an entity performing the optimization, the database may be accessed by the entity and maintained by another entity. If the database is a shared database, one of entities may be configured to maintain and access the database, whereas the other entities may be configured to access the database. Further, depending on the type of the apparatus (as discussed above and below) performing the above disclosed functionality, the actions carried out by the apparatus in question in relation to block 303 or 404 may differ. If the apparatus comprises the antenna array itself, the apparatus simply transmits, in block 303/404, said data using one or more beams formed according to the sets of optimized beamforming weights to terminal devices served. If the apparatus is a computing device connected (or connectable) electrically to the antenna array, the apparatus (e.g., a dedicated computing platform or server) transmits, in block 303/404, information on the results of the optimization (i.e., the sets of optimized beamforming weights) to the antenna array for performing beamforming. The antenna array transmits, in response to receiving said results of the optimization, data using one or more beams formed according to the sets of optimized beamforming weights to the terminal devices served. If the apparatus is a distributed unit of a distributed access node (e.g., a DU of a distributed gNB), the apparatus transmits, in block 303/404, information on results of the optimization to a remote radio unit of the access node for performing beamforming by the remote radio unit.

Figure 6:
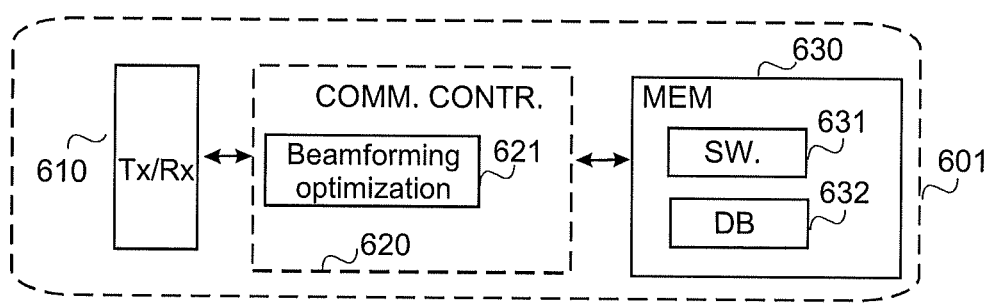
FIG. 6 illustrates an apparatus according to embodiments.

FIG. 6 provides an apparatus 601 at least for performing beamforming optimization. The apparatus may be configured to act as a processing unit for co-operation of antenna arrays. Specifically, FIG. 6 may illustrate an access node (or a sub-unit thereof, for example the) for performing beamforming optimization for one or more of co-operating antenna arrays and beamforming itself. In some embodiments, the apparatus 501 may correspond to the access node 104 of FIG. 1. Alternatively, FIG. 4 may illustrate a computing device for performing beamforming optimization (equally called, e.g., a computing system, a computing apparatus, a computing device, a server, and a computing platform). Said computing device may be connected electrically to at least one antenna array of the co-operating antenna arrays. The apparatus 601 (or specifically a computing device) may be a dedicated computing platform or a part of a dedicated computing platform. In some embodiments, said dedicated computing platform may be located (at least in part) in an edge cloud.

The apparatus 601 may comprise one or more communication control circuitries 620, such as at least one processor, and at least one memory 630, including one or more algorithms 631, such as a computer program code (software, SW) wherein the at least one memory and the computer program code (software) are configured, with the at least one processor, to cause the apparatus to carry out any one of the exemplified functionalities of the apparatus (i.e., of the access node or a computing device electrically connected to the access node) described above. Said at least one memory 630 may also comprise at least one database (DB) 632.

Referring to FIG. 6, the one or more communication control circuitry 620 comprise at least beamforming optimization circuitry 621 which is configured to optimize beamforming weights associated with transmission to a plurality of terminal devices and cause (i.e., at least trigger and possibly also perform) beamforming based on results of the optimization. To this end, the beamforming optimization circuitry 621 is configured to carry out at least some of the functionalities described above by means of any of FIGS. 2 to 4 using one or more individual circuitries.

In some embodiments, the one or more communication control circuitry 620 may further comprise beamforming circuitry for performing the beamforming (namely, if the apparatus corresponds to an access node) and/or access node communication circuitry for communicating with at least one access node.

Referring to FIG. 6, the memory 630 may be implemented using any suitable data storage technology, such as semiconductor based memory devices, flash memory, magnetic memory devices and systems, optical memory devices and systems, fixed memory and removable memory.

Referring to FIG. 6, the apparatus 601 may further comprise different interfaces 610 such as one or more signaling interfaces (TX/RX) comprising hardware and/or software for realizing communication connectivity according to one or more communication protocols. Specifically, if the apparatus 601 corresponds to an access node, the one or more signaling interfaces 610 may comprise, for example, interfaces providing a connection to one or more terminal devices, to one or more elements or devices in a core network, one or more other access nodes (or sub-units therein) and/or to one or more (external) computing devices such as (dedicated) computing platforms. If the apparatus 601 corresponds to a computing device connected electrically to an access node, the one or more signaling interfaces 610 may comprise, for example, interfaces providing a connection to one or more access nodes comprising the aforementioned access node, to one or more elements or devices in a core network and/or to one or more other (external) computing devices such as (dedicated) computing platforms. If the apparatus 601 corresponds to a distributed unit of an access node, the one or more signaling interfaces 610 may comprise, for example, interfaces providing a connection to two or more remote radio units, at least one centralized unit of the access node, one or more other access nodes (or sub-units therein) and/or to one or more (external) computing devices. The one or more signaling interfaces 610 may provide the apparatus with communication capabilities to communicate (possibly via one or more computing devices such as an access node) in a cellular or wireless communication system, to access the Internet and a core network of a wireless communications network and/or to enable communication between user devices (terminal devices) and different network nodes or elements, for example. The one or more signaling interfaces 610 may comprise standard well-known components such as an amplifier, filter, frequency-converter, (de)modulator, and encoder/decoder circuitries, controlled by the corresponding controlling units, and one or more antenna arrays.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 4 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 4 or operations thereof.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for performing beamforming optimization, the apparatus comprising:
   at least one processor; and
   at least one non-transitory memory including computer program code,
   the at least one memory and the computer program code being configured, with the at least one processor, to cause the apparatus to perform:
      maintaining, in a database, per an antenna array of co-operating antenna arrays, channel state information of a plurality of radio channels between co-operating antenna arrays and a plurality of terminal devices, wherein the antenna arrays are multiple-input multiple-output capable capable antenna arrays and the channel state information comprises second order statistics of the plurality of radio channels per an antenna array of the co-operating antenna arrays;

performing optimization to minimize, per an antenna array of the cooperating antenna arrays, total transmit power for transmission from the antenna array to terminal devices served by the antenna array subject to a predefined constraint on a minimum allowable expected value of signal-to-interference-plus-noise ratio for the terminal devices served by the antenna array, wherein the total transmit power is defined, in the optimization, based on sets of beamforming weights used for forming beams for transmitting to the served terminal devices and the predefined constraint is evaluated, in the optimization for the antenna array for at least each of the served terminal devices, by calculating expected values of signal-to-interference-plus-noise ratio for a terminal device based on the sets of beamforming weights for at least the served terminal devices, and weighted second order statistics, wherein a weighting factor for second order statistics between the served terminal devices and the antenna array is one and weighting factors for the other second order statistics less than one; and causing transmitting data using one or more beams formed according to sets of beamforming weights corresponding to minimized total transmit power from the antenna array to the served terminal devices.

2. The apparatus according to claim 1, wherein the second order statistics of the plurality of radio channels comprise, per an antenna array of the co-operating antenna arrays, for each of the plurality of radio channels between the antenna array and the plurality of terminal devices, a channel covariance matrix.

3. The apparatus according to claim 1,
wherein the second order statistics are normalized covariance matrices and performing of the optimization comprises solving an equivalent eigenvalue problem defined through an equation:

$$\left(I + \sum_j a_j \left(\sum_k \frac{\lambda_k^j}{\delta^2} R_k^j\right)\right)^{-1} R_i^l t_i^l = \frac{\delta^2}{\lambda_i^l}\left(\frac{\gamma_i}{\gamma_i + 1}\right) t_i^l,$$

where
i and k are indices indicating the ith and kth terminal device of the plurality of terminal devices,
j and l are indices referring to a jth antenna array and lth antenna array of the cooperating antenna arrays,
I is an identity matrix,
$a_j$ is a weighting factor of jth antenna array having a value $\leq 1$,
$\lambda_k^j$ a Lagrangian multiplier for the jth antenna array for the kth terminal device,
$\delta^2$ is a noise term,
$R_k^j$ is a channel covariance matrix for the jth antenna array defined as $E(H_k^H H_k)$ with $H_k$ being a channel matrix for the kth terminal device for the jth antenna array, E denoting an expected value and H denoting a conjugate transpose operation,
$t_i^l$ is a beamforming matrix for the ith terminal device defining a set of beamforming weights for the lth antenna array,
$\gamma_i$ is the minimum allowable expected value of signal-to-interference-plus-noise ratio for the ith terminal device.

4. The apparatus according to claim 1, wherein the solving of said equivalent eigenvalue problem comprises:
calculating, for each i indicating the ith terminal device of the served terminal devices, a matrix defined as $$I + \sum_j a_j \left(\sum_k \frac{\lambda_k^j}{\delta^2} R_k^j\right);$$

finding, for each i indicating the ith terminal device served by the lth antenna array of interest, dominant eigenvectors of $$\left(I + \sum_j a_j \left(\sum_k \frac{\lambda_k^j}{s^2} R_k^j\right)\right)^{-1} R_i^l,$$

wherein each dominant eigenvector corresponds to a set of optimal beamforming weights for a terminal device of the plurality of terminal devices.

5. The apparatus according to claim 1, wherein the Lagrangian multiplier $\lambda_k^j$, for all j and for all k, has a predefined value.

6. The apparatus according to claim 5, wherein the Lagrangian multiplier $\lambda_k^j$ has the same value for all j and for all k.

7. The apparatus according to claim 1, wherein the co-operating antenna arrays are not cross-calibrated.

8. The apparatus according to claim 1, wherein the apparatus is an access node, a macro base station, a computing device connected electrically to one or more of the co-operating antenna arrays, or a distributed unit of a distributed access node.

9. The apparatus according to claim 8, wherein the causing of the transmitting of the data comprises:
if the apparatus comprises the antenna array, transmitting said data using the one or more beams formed according to the sets of optimized beamforming weights for the antenna array to the terminal devices served;
if the apparatus is the computing device connected electrically to one or more antenna arrays, transmitting information on results of the optimization to the antenna arrays for performing beamforming by the antenna arrays; and
if the apparatus is the distributed unit of the distributed access node, transmitting information on results of the optimization to a remote radio unit for performing beamforming by the remote radio unit.

10. A method comprising:
maintaining, in a database, per an antenna array of co-operating antenna arrays, channel state information of a plurality of radio channels between co-operating antenna arrays and a plurality of terminal devices, wherein the antenna arrays are multiple-input multiple-output capable antenna arrays and the channel state information comprises second order statistics of the plurality of radio channels per an antenna array of the co-operating antenna arrays;
performing optimization to minimize, per an antenna array of the co-operating antenna arrays, total transmit power for transmission from the antenna array to terminal devices served by the antenna array subject to a predefined constraint on a minimum allowable expected value of signal-to-interference-plus-noise ratio for the terminal devices served by the antenna array, wherein the total transmit power is defined, in the optimization, based on sets of beamforming weights used for forming beams for transmitting to the served terminal devices and the predefined constraint is evaluated, in the optimization for the antenna array for at least each of the served terminal devices, by calculating expected values of signal-to-interference-plus-noise ratio for a terminal device based on the sets of beamforming weights for at least the served terminal devices, and weighted second order statistics, wherein a weighting factor for second order statistics between the served terminal devices and the antenna array is one and weighting factors for the other second order statistics less than one; and causing transmitting data using one or more beams formed according to sets of beamforming weights corresponding to minimized total transmit power from the antenna array to the served terminal devices.

11. A non-transitory computer-readable medium comprising program instructions, which, when run by an apparatus, causes the apparatus to to carry out at least:

accessing a database comprising, per an antenna array of co-operating antenna arrays, channel state information of a plurality of radio channels between cooperating antenna arrays and a plurality of terminal devices, wherein the antenna arrays are multiple-input multiple-output capable antenna arrays and the channel state information comprises second order statistics of the plurality of radio channels per an antenna array of the co-operating antenna arrays;

performing optimization to minimize, per an antenna array of the co-operating antenna arrays, total transmit power for transmission from the antenna array to terminal devices served by the antenna array subject to a predefined constraint on a minimum allowable expected value of signal-to-interference-plus-noise ratio for the terminal devices served by the antenna array, wherein the total transmit power is defined, in the optimization, based on sets of beamforming weights used for forming beams for transmitting to the served terminal devices and the predefined constraint is evaluated, in the optimization for the antenna array for at least each of the served terminal devices, by calculating expected values of signal-to-interference-plus-noise ratio for a terminal device based on the sets of beamforming weights for at least the served terminal devices, and weighted second order statistics, wherein a weighting factor for second order statistics between the served terminal devices and the antenna array is one and weighting factors for the other second order statistics less than one; and causing transmitting data using one or more beams formed according to sets of beamforming weights corresponding to minimized total transmit power from the antenna array to the served terminal devices.

12. The computer readable medium of claim 11, further comprising program instructions, which, when run by an apparatus, causes the apparatus to to carry out maintaining the channel state information in the database.

* * * * *